Sept. 25, 1951 A. J. GARBIN 2,569,303
MANUFACTURE OF ENDLESS V BELTS
Filed Oct. 31, 1950
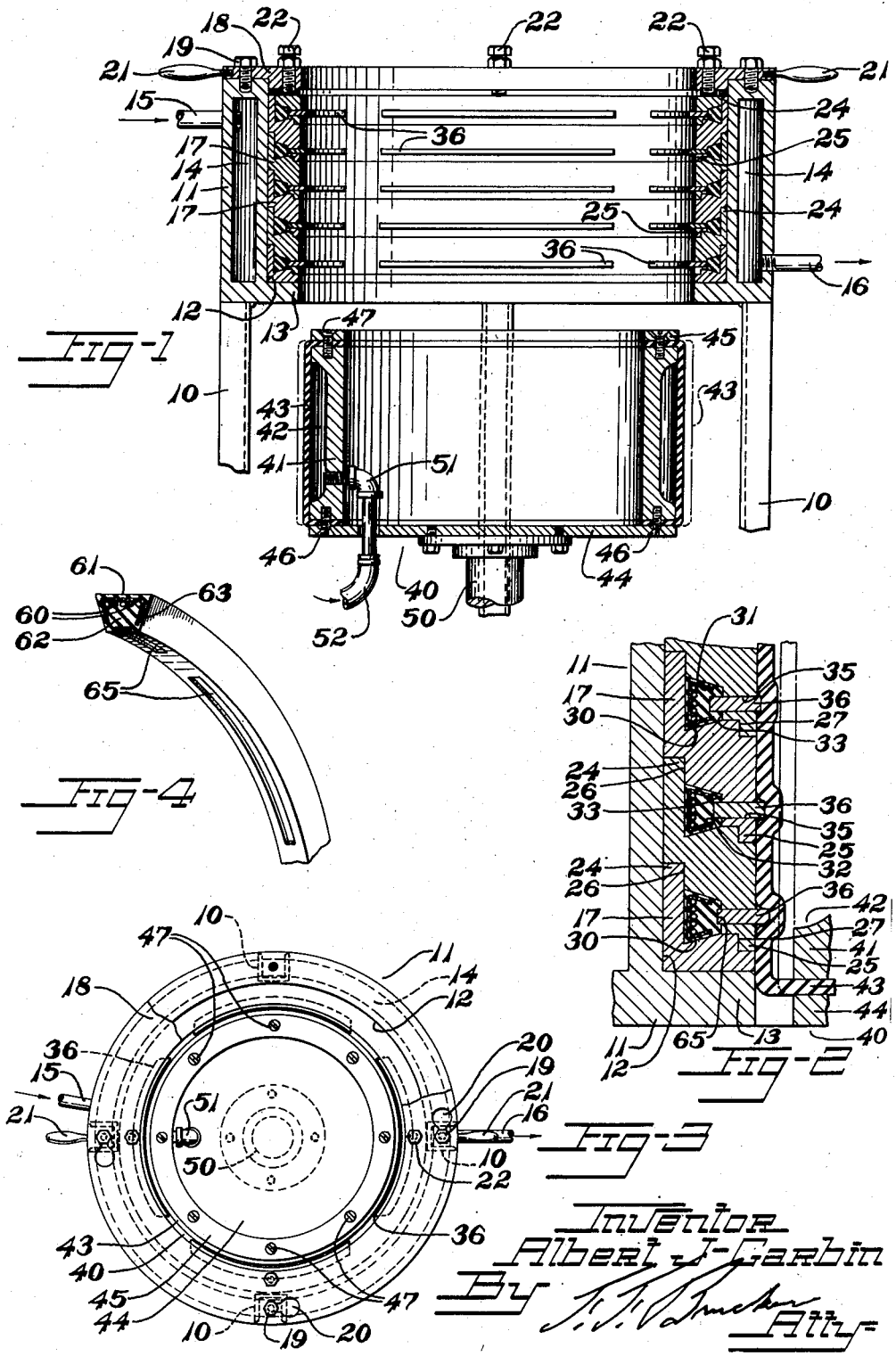

Patented Sept. 25, 1951

2,569,303

UNITED STATES PATENT OFFICE 2,569,303

MANUFACTURE OF ENDLESS V BELTS

Albert J. Garbin, Cuyahoga Falls, Ohio, assignor to The B. F. Goodrich Company, New York, N. Y., a corporation of New York Application October 31, 1950, Serial No. 193,269

4 Claims. (Cl. 18—6)

This invention relates to the manufacture of endless belts of reinforced rubber material and is especially useful in the manufacture of belts of trapezoidal cross-section commonly known as V-belts.

In the manufacture of endless V-belts of reinforced rubber material, the materials are assembled to provide an endless unvulcanized belt body approximating the size and shape of a finished belt. These bodies have heretofore been vulcanized either by assembling them in the outwardly open circumferential grooves of a curing drum and then applying confining pressure thereto as by a wrapping of rags or by a clamping band, or the belts were enclosed between annular mold members which were pressed together to form the belts to the desired size. These prior methods have required that the unvulcanized belt bodies be of substantially the desired amount of material as a belt body of too little material would not fill the mold cavity or groove and consequently would receive little or no pressure during vulcanization whereas a belt body of oversize would be forced out of the mold groove and would be irregular in shape. Such belts also required trimming after vulcanization and in the case of full molding the reinforcing material was sometimes displaced from its normal position to such an extent as to cause these belts to perform improperly in use.

The present invention aims to provide a set of belts of uniform dimensions and properties fully molded on all faces and of uniform density.

Further objects of the invention are to provide improved molding apparatus for providing improved positioning of the reinforcing and cushioning material of the belts.

Other objects are to provide uniform density of the belts, to equalize variation in volume of a set of belts, to eliminate trimming of the belts, and to provide belts of longer life.

These and other objects will appear from the following description and the accompanying drawings.

Of the drawings,

Fig. 1 is a cross-sectional view of apparatus constructed in accordance with the invention, showing the unvulcanized belts in place.

Fig. 2 is a cross-sectional enlarged view of a portion thereof showing the belts in vulcanizing position.

Fig. 3 is a plan view of the apparatus of Fig. 1.

Fig. 4 is a cross-sectional perspective view of a portion of a vulcanized belt made in accordance with and embodying the invention.

Referring to the drawings, the numeral 10 designates a supporting frame on which is mounted a heating jacket 11 having a cylindrical bore 12 terminating in an inwardly directed flange 13. A steam chamber 14 is formed in the wall of the jacket and is connected by supply and drain pipes 15 and 16 respectively whereby steam may be circulated therethrough at the desired vulcanizing temperature. A series of mold rings 17 are adapted to be seated in stacked relation within the bore of the jacket 11 and are held therein by a removable cover flange 18 secured thereto by bolts 19. The bolts 19 pass through key-hole slots 20 and the flange 18 is provided with handles 21 for rotating and lifting it for removal and replacement. Screws 22 are threaded through the flange 18 and impinged against the upper mold ring of the stack to hold the mold rings in face to face abutting relation. The arrangement is such that by loosening bolts 19 and screws 22, the flange 18 may be rotated slightly and removed without removal of bolts 19, thereby permitting removal of mold rings 17.

The mold rings 17 may all be interchangeable with the possible exception of the top and bottom rings which may be of modified construction, as shown, to provide flat surfaces for seating on the flanges 13 and 18. Each intermediate ring is preferably formed with telescoping flanges one extending upwardly, as at 24, at the outer circumference of the ring and the other extending downwardly, as at 25 at the lower side of the ring to engage in circumferential rabbets 26 and 27 respectively of adjacent rings, the telescoping rabbets and flanges acting as dowels to align the rings.

Between adjoining faces of adjacent rings, annular cavities 30 having the cross-sectional shape of the desired belt are formed. These cavities, in the example shown are of trapezoidal cross-section, the outer face of the cavity being formed by the inner face of the flange 24 of one ring, the inclined side faces of the cavity being provided by inclined faces 31, 32 of the opposing rings, and the inner circumferential face of the cavity being provided by a face 33 of the adjacent ring. The lowermost and uppermost rings are similarly provided with cavity-forming faces but may have an opposite face which is in a single plane to seat on the flanges of the jacket.

At the inner molding faces 33, the rings having such faces are formed with radial slots or openings 35 extending through the inner faces of the molding rings and movable plungers 36 are mounted in these openings, the plungers being fitted in the openings and being of such dimensions radially of the molding rings as to exceed the thickness of the ring at the position of penetration. The molding faces of the plungers correspond in curvature with the molding faces 33 when the plungers project as shown in Fig. 2, at the inside of the mold rings.

With the mold rings assembled in position within the jacket and the plungers in the openings and an unvulcanized belt in each molding cavity, it will be apparent that forcing of the plungers radially outward will displace material of the belts and cause the belts to fill the cavities completely without overflow. To provide equalized pressure of the plungers radially outward a movable pressure applying member 40 is provided. As shown this pressure-applying member is a hollow drum 41 having a circumferential recess 42 formed in its outer cylindrical face. A flexible elastic element such as the diaphragm 43 of rubber surrounds the drum and its circumferential margins are secured thereto by a plate 44 and an opposite flange ring 45 is secured to the drum by screws 46, 47 respectively. The plate 44 may serve to support the drum from a ram 50 whereby the drum may be moved axially of the jacket 11 into and out of the space surrounded by the molding rings. A pipe 51 is connected to the recess 42 and is in turn connected by a flexible hose 52 to a source of fluid pressure (not shown) whereby the diaphragm 43 may be expanded.

As shown in Fig. 2, with the drum moved within the space enclosed by the mold rings, the diaphragm 43, which normally clears the plungers 36, may be expanded to engage the plungers 36 and force them radially outward against the belts in the molding cavities. Belts are usually provided with a tension layer 60 of cords, wires, or other reinforcing material near the outer face 61 of the belt, a compression body 62 of rubber composition, and a cover 63 of bias laid fabric or other wear-resisting and flexible material thereabout. The compression body 62 is located adjacent the plungers 36 in the vulcanizing mold and outward radial movement of the plungers displaces the rubber material, placing the tension layer 60 under tension and forcing the cover 61 into intimate contact with the mold faces. Any differences in volume of the belt bodies are compensated for by differential movement of the plungers 36 permitted by the flexible diaphragm 43 under fluid pressure so that when the belt bodies are lower in volume than the optimum value, the plungers 36 are forced deeper into the belt body than where the bodies are of optimum volume or of greater than optimum volume as seen in Fig. 2. This is illustrated in Fig. 2 where the plungers are advanced by different amounts in different belt molding cavities.

The resulting belts have cavities 65 formed in the inner faces thereof due to penetration of the plungers. This is not objectionable as the inner face of a side-driving V-belt does not contact the pulleys in use. The driving faces and the outer circumferential faces are neatly formed and free from overflow and the tension layer is properly positioned. The inner faces of the belts are also neatly formed and the belts are of uniform width and thickness. Due to the nested construction of the mold rings, the jacket 11 may be eliminated and the stack of rings merely held together by clamps or bolts in which case the entire apparatus may be placed in an open steam vulcanizer for supplying the vulcanizing temperature. The jacket however is a convenient means for clamping the rings and applying the heat thereto.

In the operation of the apparatus, the molding rings are placed in the jacket one at a time, belt bodies being interposed therebetween in the molding cavities, the plungers being withdrawn radially inward of the rings. The flange 18 is secured and the screws 22 are tightened to hold the mold rings in place. The drum 41 is then entered within the jacket and fluid under pressure is supplied through hose 52 to the diaphragm. The diaphragm is expanded forcing the plungers outwardly against the belt bodies thereby causing the belt bodies to fill the molds. The belts are then vulcanized by steam applied to the jacket. After vulcanization the mold rings and the belts are removed from the jacket.

While the invention has been described as applied to the molding and vulcanizing of V-belts, belts of other cross-section may be made in the same manner.

Variations may be made without departing from the scope of the invention as it is defined by the following claims.

I claim:

1. Apparatus for molding endless belts, said apparatus comprising mating mold rings having belt-molding cavities formed between their mating faces, means for clamping said mold rings in stacked relation, radial openings through said rings from their inner faces connecting with said molding cavities, movable plungers slideably mounted in said openings in pressure-transmitting relation to belts in said cavities, a flexible element, means for supporting said element in pressure-transmitting relation to the plungers of a plurality of said cavities simultaneously, and means for applying pressure to said element to force said plungers radially outward to apply uniform pressure to belt bodies independently of movement of said plungers.

2. Apparatus for molding endless V-belts, said apparatus comprising mating mold rings having belt-molding cavities of trapezoidal cross-section formed between their mating faces, means for clamping said mold rings in stacked relation, radial openings through said rings from their inner faces connecting with said molding cavities, movable plungers slideably mounted in said openings in pressure-transmitting relation to belts in said cavities, a flexible element, means for supporting said element in pressure-transmitting relation to the plunger of a plurality of said cavities simultaneously, and means for applying pressure to said element to force said plungers radially outward to apply uniform pressure to belt bodies independently of movement of said plungers.

3. Apparatus for molding endless belts, said apparatus comprising mating mold rings having belt molding cavities formed between their mating faces and having overlapping flanges for holding them in nested stacked relation, means for clamping the stacked rings against axial deflection, said rings having radial openings therethrough at their inner peripheries connecting with said molding cavities, movable plungers slideably mounted in said openings in pressure-transmitting relation to belts in said cavities for movement radially of the rings, a flexible element, means for supporting said element in pressure-transmitting relation to the plungers of a plurality of said cavities simultaneously, and means for applying pressure to said element to force said plungers radially outward to apply uniform pressure to belt bodies independently of movement of said plungers.

4. Apparatus for molding endless belts, said apparatus comprising mating mold rings having belt-molding cavities formed between their mating faces, a steam-chambered treating jacket having a bore for receiving said mold rings in stacked relation, means at opposite ends of the jacket for clamping said rings therebetween against deflection, said rings having radial openings at their inner faces connected with said molding cavities, movable plungers slideably mounted in said openings in pressure-transmitting relation to belts in said cavities, a flexible diaphragm simultaneously engageable with all of the radially inner ends of said plungers, means for supporting said diaphragm in pressure-transmitting relation to the plungers of a plurality of said cavities simultaneously, means for applying fluid pressure to said diaphragm to force said plungers radially outward to apply uniform pressure to belt bodies therein independently of movement of said plungers, and means for heating said jacket to vulcanize the belt bodies in said molding cavities.

ALBERT J. GARBIN.

No references cited.